United States Patent
Deng (10) Patent No.: US 9,607,197 B2
(45) Date of Patent: Mar. 28, 2017

(54) METHOD FOR PERFORMING OPTIMIZATION PROCESS ON TWO-DIMENSION CODE PICTURE AND MOBILE TERMINAL

(71) Applicant: TENCENT TECHNOLOGY (SHENZHEN) COMPANY LIMITED, Shenzhen (CN)

(72) Inventor: Chao Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 22 days.

(21) Appl. No.: 14/730,323

(22) Filed: Jun. 4, 2015

(65) Prior Publication Data

US 2015/0269404 A1 Sep. 24, 2015

Related U.S. Application Data

(63) Continuation of application No. PCT/CN2013/087549, filed on Nov. 21, 2013.

(30) Foreign Application Priority Data

Dec. 12, 2012 (CN) .......................... 2012 1 0535209

(51) Int. Cl.
G06K 19/06 (2006.01)
G06K 7/12 (2006.01)
G06K 9/36 (2006.01)

(52) U.S. Cl.
CPC ........ *G06K 7/12* (2013.01); *G06K 9/36* (2013.01)

(58) Field of Classification Search
CPC ................................. G06K 7/10; G06K 9/60

(Continued)

(56) References Cited

U.S. PATENT DOCUMENTS 8,079,525 B1* 12/2011 Zolotov ............. G06K 7/10722
235/462.04
2005/0103846 A1* 5/2005 Zhu ..................... G06K 7/10732
235/462.07

(Continued)

FOREIGN PATENT DOCUMENTS

CN 101093553 A 12/2007
CN 102081802 A 6/2011

(Continued)

OTHER PUBLICATIONS

Search Report in International Application No. PCT/CN2013/087549 dated Feb. 27, 2014.

(Continued)

*Primary Examiner* — Daniel St Cyr
(74) *Attorney, Agent, or Firm* — Marshall, Gerstein & Borun LLP (57) ABSTRACT

A method for performing an optimization process on a two-dimension code picture may include the follows. A color filtering process is performed on an obtained two-dimension code picture, and a color-filtered two-dimension code picture is obtained. A median filtering process is performed on the color-filtered two-dimension code picture, and a median-filtered two-dimension code picture is obtained. A binarization process is performed on the median-filtered two-dimension code picture, and a binary image is obtained, such that a two-dimension code in the two-dimension code picture may be effectively identified by utilizing the binary image, and accuracy for identifying the two-dimension code may also be improved.

12 Claims, 4 Drawing Sheets

(58) Field of Classification Search
USPC .................. 235/462.04, 462.09, 462.1, 469
See application file for complete search history.

(56) References Cited

U.S. PATENT DOCUMENTS

2006/0219792 A1* 10/2006 Zhu .................... G06F 9/44526
235/462.06
2014/0239071 A1* 8/2014 Hennick ............ G06K 7/10732
235/455

FOREIGN PATENT DOCUMENTS

| CN | 102136058 A | 7/2011 |
| CN | 102236930 A | 11/2011 |
| EP | 1416715 A1 | 5/2004 |
| KR | 20010044743 A | 6/2001 |

OTHER PUBLICATIONS

International Preliminary Report on Patentability, International Application No. PCT/CN2013/087549, mailed Jun. 25, 2015.
Office Action (with concise explanation of relevance in English), Chinese patent application No. 2012105352099, dated Oct. 8, 2016.

* cited by examiner

METHOD FOR PERFORMING OPTIMIZATION PROCESS ON TWO-DIMENSION CODE PICTURE AND MOBILE TERMINAL

This application is a U.S. continuation of International Application No. PCT/CN2013/087549, filed Nov. 21, 2013. This application claims the benefit and priority of Chinese Patent Application No. 201210535209.9, filed Dec. 12, 2012. The entire disclosures of each of the above applications are incorporated by reference.

TECHNICAL FIELD

The present disclosure relates to computer information processing technologies, and more particularly, to a method for performing an optimization process on a two-dimension code picture and a mobile terminal.

BACKGROUND

Common electronic barcode belong to widely used one-dimension barcode technologies. International common coding modes include various standards, such as EAN-8, UPC-A, UPC-E, and so on, applications of which have been quite wide. However, information amount contained is relatively small, and is only limited to numbers, which may not meet the requirements of information explosion era at present. Since the improvement of information technologies and hardware development, capacity of the electronic barcode may be expanded. Thus, standards and technologies about two-dimension code are generated. In addition to numbers and symbols, language may also be added to some coding modes. QR code is the most popular. Accompanying with rapid development of hardware device at present, a scheme of rapidly identifying a two-dimension code occurs. The two-dimension code will become important electronic barcode technologies.

At present, the two-dimension code is a new coding scheme based on traditional barcode. After performing an error correction coding on information, such as character, text, image, two-dimension barcode symbol represented by the obtained binary code stream may be referred to as the two-dimension code. Compared with the traditional one-dimension code, the two-dimension code may represent Chinese character information and image information, which possesses high information capacity, accurate descriptions, forgery prevention, stronger correction capacity, and doesn't depend on database support, and so on. At present, the two-dimension code has been popularly applied in the following aspects, such as document literacy, logistics, electronic data interchange.

Wider range of applications of the two-dimension code has been brought by the combination of the two-dimension code and mobile phone. After downloading and installing two-dimension code identification software, a mobile phone user may obtain necessary information, by initiating the software and taking a picture of an interested two-dimension code with a mobile phone camera.

In the prior art, a mobile phone may directly perform a two-dimension code identification process on an obtained picture with a two-dimension code, so as to obtain the two-dimension code. However, due to pixel problem of the mobile phone and much image noise generally mixed with an image collected by the mobile terminal, and it is easy to confuse the two-dimension code and around image due to similar color, the mobile phone may not identify the two-dimension code in the two-dimension code picture. Thus, accuracy about the two-dimension code identification may be lower.

SUMMARY

Examples of the present disclosure provide a method for performing an optimization process on a two-dimension code picture and a mobile terminal. The provided method may be used by the mobile terminal to process a two-dimension code picture before identifying a two-dimension code, such that accuracy of two-dimension code identification may be improved effectively.

In accordance with an example of the present disclosure, a method for performing an optimization process on a two-dimension code picture, includes:

performing a color filtering process on an obtained two-dimension code picture, obtaining a color-filtered two-dimension code picture;

performing a median filtering process on the color-filtered two-dimension code picture, obtaining a median-filtered two-dimension code picture;

performing a binarization process on the median-filtered two-dimension code picture, obtaining a binary image, and utilizing the binary image to effectively identify a two-dimension code in the two-dimension code picture.

In accordance with an example of the present disclosure, a mobile terminal includes a color filtering module, a filtering module and a binarization module, in which the color filtering module is to perform a color filtering process on an obtained two-dimension code picture, and obtain a color-filtered two-dimension code picture;

the filtering module is to perform a median filtering process on the color-filtered two-dimension code picture, and obtain a median-filtered two-dimension code picture, after the color filtering module has obtained the color-filtered two-dimension code picture; and the binarization module is to perform a binarization process on the median-filtered two-dimension code picture, obtain a binary image, after the filtering module obtains the median-filtered two-dimension code picture, so as to utilize the binary image to effectively identify a two-dimension code in the two-dimension code picture.

In accordance with an example of the present disclosure, a mobile terminal including a memory, a processor in communication with the memory, and an interface, in which the memory stores a color filtering instruction, a filtering instruction and a binarization instruction, which are executable by the processor, the color filtering instruction indicates to perform a color filtering process on a two-dimension code picture obtained via the interface, and obtain a color-filtered two-dimension code picture;

the filtering instruction indicates to perform a median filtering process on the color-filtered two-dimension code picture, and obtain a median-filtered two-dimension code picture, after the color-filtered two-dimension code picture has been obtained based on the color filtering instruction; and the binarization instruction indicates to perform a binarization process on the median-filtered two-dimension code picture, obtain a binary image, after the median-filtered two-dimension code picture has been obtained based on the filtering instruction, so as to utilize the binary image to effectively identify a two-dimension code in the two-dimension code picture.

Based on the foregoing technical solutions, it can be seen that the examples of the present disclosure may possess the following advantages.

A mobile terminal may perform a color filtering process on an obtained two-dimension code picture, obtain a color-filtered two-dimension code picture, perform a median filtering process on the color-filtered two-dimension code picture, obtain a median-filtered two-dimension code picture, perform a binarization process on the median-filtered two-dimension code picture, and obtain a binary image, so as to perform a two-dimension code identification on the binary image, which is obtained after performing the color filtering, the median filtering and the binarization process on the two-dimension code picture. Thus, accuracy for identifying the two-dimension code may be improved effectively.

DETAILED DESCRIPTIONS

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Examples of the present disclosure provide a method for performing an optimization process on a two-dimension code picture and a mobile terminal. The provided method may be used by the mobile terminal to perform the optimization process on the two-dimension code picture, and to identify a two-dimension code from a binary image obtained after executing the optimization process. Thus, the accuracy for identifying the two-dimension code may be improved effectively.

Figure 1:
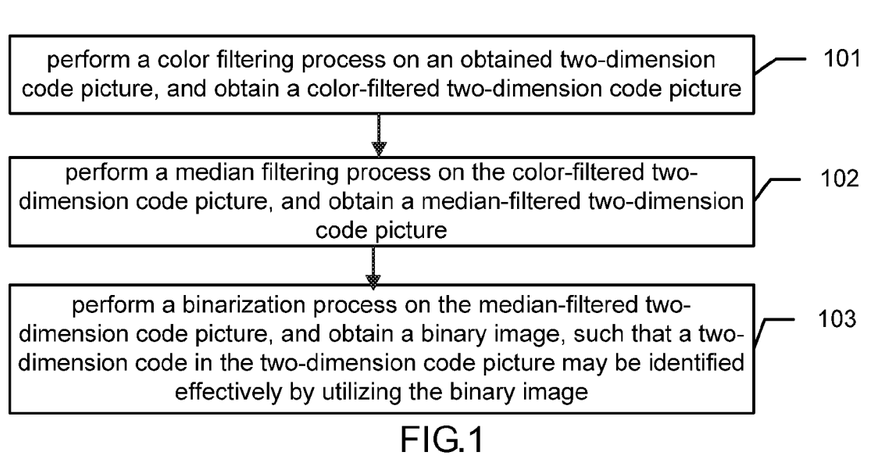
FIG. 1 is a flowchart illustrating a method for performing an optimization process on a two-dimension code picture, in accordance with an example of the present disclosure.

With reference to FIG. 1, FIG. 1 is a flowchart illustrating a method for performing an optimization process on a two-dimension code picture, in accordance with an example of the present disclosure. As shown in FIG. 1, the method may include the following blocks.

In block 101, perform a color filtering process on an obtained two-dimension code picture, and obtain a color-filtered two-dimension code picture.

In the example of the present disclosure, there is a camera set in a mobile terminal. A user may utilize the camera of the mobile terminal to aim at a two-dimension code, and take the two-dimension code picture. Thus, the mobile terminal may utilize the camera to obtain the two-dimension code picture. The mobile terminal will perform a color filtering process on the obtained two-dimension code picture, obtain a color-filtered two-dimension code picture, so as to implement processes about brightness increasing of the two-dimension code picture.

In block 102, perform a median filtering process on the color-filtered two-dimension code picture, and obtain a median-filtered two-dimension code picture.

In the example of the present disclosure, the mobile terminal may utilize the camera to obtain noise in the two-dimension code picture. Thus, the mobile terminal may also perform the median filtering process on the color-filtered two-dimension code picture, and obtain the median-filtered two-dimension code picture, so as to implement noise removal processes of the two-dimension code picture.

In block 103, perform a binarization process on the median-filtered two-dimension code picture, and obtain a binary image, such that the two-dimension code in the two-dimension code picture may be identified effectively by utilizing the binary image.

In the example of the present disclosure, after performing the median filtering process on the color-filtered two-dimension code picture, and obtaining the median-filtered two-dimension code picture, the mobile terminal may perform the binarization process on the median-filtered two-dimension code picture, and obtain the binary image, such that the two-dimension code may be identified by utilizing the binary image. Thus, the two-dimension code in the binary image may be identified effectively, and the accuracy for identifying the two-dimension code may also be improved.

In the example of the present disclosure, after obtaining the two-dimension code picture, the mobile terminal may perform the color filtering process on the two-dimension code picture, obtain the color-filtered two-dimension code picture, perform the median filtering process on the color-filtered two-dimension code picture, obtain the median-filtered two-dimension code picture, perform the binarization processing on the median-filtered two-dimension code picture, obtain the binary image, and identify the two-dimension code by utilizing the binary image, such that accuracy for identifying the two-dimension code may be improved effectively.

Figure 2:
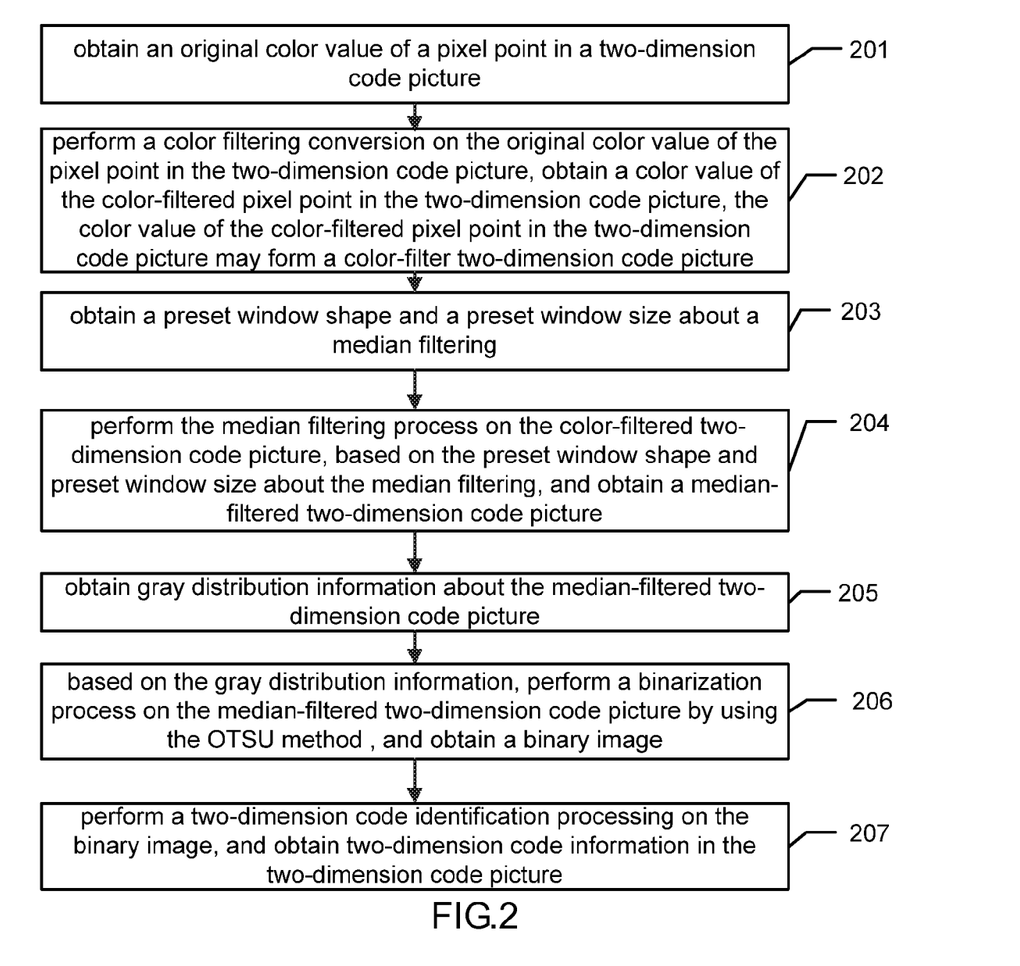
FIG. 2 is a flowchart illustrating another method for performing an optimization process on a two-dimension code picture, in accordance with an example of the present disclosure.

To better understand the method for performing the optimization process on the two-dimension code picture, in accordance with the example of the present disclosure, please refer to FIG. 2. FIG. 2 is a flowchart illustrating another method for performing the optimization process on the two-dimension code picture, in accordance with an example of the present disclosure. The provided method may include the following blocks.

In block 201, obtain an original color value of a pixel point in a two-dimension code picture.

In the example of the present disclosure, after obtaining the two-dimension code picture taken by a camera, a mobile terminal may obtain the original color value of the pixel point in the two-dimension code picture.

In block 202, perform a color filtering conversion on the original color value of the pixel point in the two-dimension code picture, and obtain a color value of the color-filtered pixel point in the two-dimension code picture. The color value of the color-filtered pixel point in the two-dimension code picture may form the color-filtered two-dimension code picture.

In the example of the present disclosure, the mobile terminal may perform the color filtering conversion on the original color value of the pixel point in the two-dimension code picture, and obtain the color value of the color-filtered pixel point in the two-dimension code picture. The color value of the color-filtered pixel point in the two-dimension code picture may form the color-filtered two-dimension code picture.

In the example of the present disclosure, the color filtering conversion may be performed on the pixel point in the two-dimension code picture by utilizing a preset color filtering conversion formula. The color filtering conversion formula may be as follows.

Target Color=origin Color+origin Color(1−origin Color)

When executing the color filtering conversion, the above color filtering conversion formula may be utilized to perform the color filtering conversion on pixel points in the two-dimension code picture in turn.

In block 203, obtain a preset window shape and a preset window size, which are about the median filtering.

In the example of the present disclosure, the two-dimension code picture taken by the camera of the mobile terminal may include noise. Since the noise comes from a camera of an optical collecting system, the noise in the two-dimension code picture may comply with the Salt-and-Pepper Noise in the Poisson distribution. The noise in the two-dimension code picture may be removed effectively by adopting the median filtering of an appropriate size rectangular window In the example of the present disclosure, the median filtering is a non-linear processing method about noise suppression. For n numbers given, arrange them in a descending order. When n is an odd number, the value in the intermediate position may be referred to as the median number of the n numbers. When n is an even number, an average value of two numbers in the middle positions may be referred to as the median value of the n numbers. The basic principle of the median filtering refers to as follows. Replace the value of a pixel point in a digital image or digital sequence with the median value of each pixel point within a field of the pixel point. The effect of noise removal generated by the median filtering is dependent on two related and completely separated factors: the window size and window shape formed by space range of the field. Thus, when processing the two-dimension code picture by using the median filtering, the window shape and window size used may be determined firstly.

In the example of the present disclosure, the window shape and window size used for performing the median filtering may be preset. For example, regarding a picture with QR code, since the basic model of QR code image is a square, the window shape used by the median filtering about the two-dimension code picture carrying the QR code may be configured as a square. The preset window size is 3*3, or 5*5, or 7*7. It should be noted that, in the example of the present disclosure, the system may adjust the window shape and window size about the median filtering based on practical conditions, which is not limited here.

In the example of the present disclosure, after obtaining the color-filtered two-dimension code picture, the mobile terminal may obtain the preset window shape and window size about the median filtering.

In block 204, perform the median filtering process on the color-filtered two-dimension code picture, based on the preset window shape and window size about the median filtering, and obtain the median-filtered two-dimension code picture.

In the example of the present disclosure, after obtaining the preset window shape and window size about the median filtering, the mobile terminal may perform the median filtering process on the color-filtered two-dimension code picture, based on the preset window shape and window size about the median filtering, and obtain the median-filtered two-dimension code picture.

In block 205, obtain gray distribution information about the median-filtered two-dimension code picture.

In block 206, based on the gray distribution information, perform the binarization process on the median-filtered two-dimension code picture with an OTSU method, which may be also referred to as maximum between-class variance method, and obtain a binary image.

In the example of the present disclosure, the mobile terminal may obtain the gray distribution information about the median-filtered two-dimension code picture, and based on the gray distribution information, perform the binarization process on the median-filtered two-dimension code picture with the OTSU method, which may be also referred to as maximum between-class variance method, and obtain the binary image.

It should be noted that, in the example of the present disclosure, other methods may also be used to perform the binarization process on the median-filtered two-dimension code picture, e.g., the domain value method may also be used. In practical applications, the method for performing the binarization process may be determined based on practical conditions, which is not limited here.

In block 207, perform a two-dimension code identification process on the binary image, and obtain two-dimension code information in the two-dimension code picture.

In the example of the present disclosure, after obtaining the binary image, the mobile terminal may perform the two-dimension code identification process on the binary image, and obtain the two-dimension code information in the two-dimension code picture.

In the example of the present disclosure, by obtaining the original color value of the pixel point in the two-dimension code picture, perform the color filtering conversion on the original color value, obtain the color-filtered two-dimension code picture, perform the median filtering process on the color-filtered two-dimension code picture by utilizing the preset window shape and window size about the median filtering, obtain the median-filtered two-dimension code picture, perform the binarization process on the median-filtered two-dimension code picture with the OTSU method, which may be also referred to as maximum between-class variance method, based on the gray distribution information about the median-filtered two-dimension code picture, obtain the binary image, perform the two-dimension code identification process on the binary image, and obtain the two-dimension code information in the two-dimension code picture, such that the two-dimension code identification may be effectively implemented, and accuracy about the two-dimension code identification may also be improved.

Figure 3:
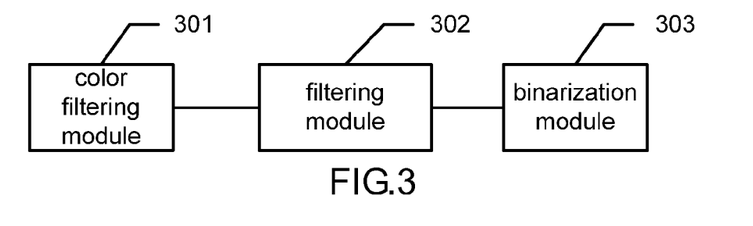
FIG. 3 is a schematic diagram illustrating structure of a mobile terminal, in accordance with an example of the present disclosure.

With reference to FIG. 3, FIG. 3 is a schematic diagram illustrating structure of a mobile terminal, in accordance with an example of the present disclosure. As shown in FIG. 3, the mobile terminal may include the following modules.

A color filtering module 301, which is configured to perform a color filtering process on an obtained two-dimension code picture, and obtain a color-filtered two-dimension code picture.

A filtering module 302, which is configured to perform a median filtering process on the color-filtered two-dimension code picture, and obtain a median-filtered two-dimension code picture, after the color filtering module 301 has obtained the color-filtered two-dimension code picture.

A binarization module 303, which is configured to perform a binarization process on the median-filtered two-dimension code picture, and obtain a binary image, such that the two-dimension code in the two-dimension code picture may be identified effectively by utilizing the binary image, after the filtering module 302 has obtained the median-filtered two-dimension code picture.

In the example of the present disclosure, after obtaining the two-dimension code picture by the mobile terminal, the color filtering module 301 may perform the color filtering process on the obtained two-dimension code picture, and obtain the color-filtered two-dimension code picture. Subsequently, the filtering module 302 may perform the median filtering process on the color-filtered two-dimension code picture, and obtain the median-filtered two-dimension code picture. Finally, the binarization module 303 may perform the binarization process on the median-filtered two-dimension code picture, and obtain the binary image, such that the two-dimension code in the two-dimension code picture may be effectively identified by utilizing the binary image.

In the example of the present disclosure, after obtaining the two-dimension code picture, the mobile terminal may perform the color filtering process on the obtained two-dimension code picture, obtain the color-filtered two-dimension code picture, perform the median filtering process on the color-filtered two-dimension code picture, obtain the median-filtered two-dimension code picture, perform the binarization process on the median-filtered two-dimension code picture, obtain the binary image, and utilize the binary image to identify the two-dimension code, such that the accuracy for identifying the two-dimension code may be improved effectively.

Figure 4:
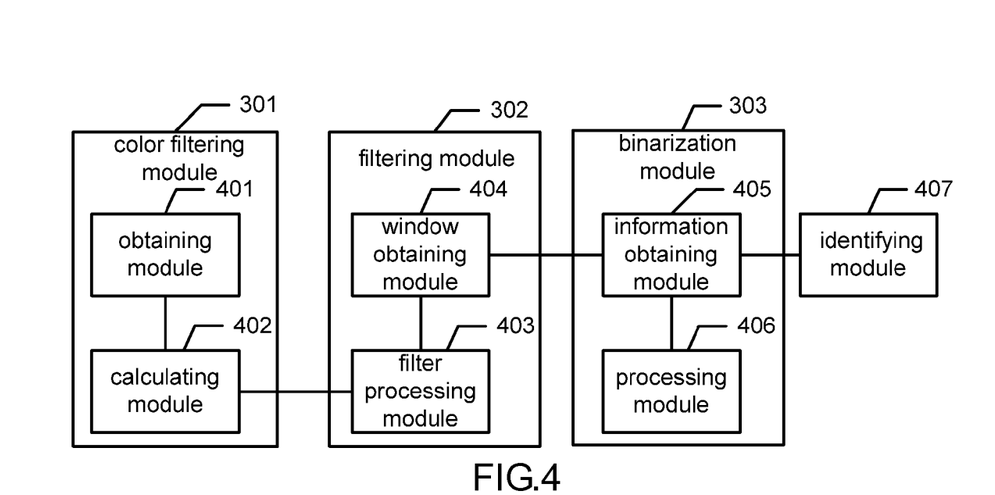
FIG. 4 is a schematic diagram illustrating another structure of a mobile terminal, in accordance with an example of the present disclosure.

To better understand the structure of the mobile terminal in the example of the present disclosure, please refer to FIG. 4. FIG. 4 is a schematic diagram illustrating structure of another mobile terminal, in accordance with an example of the present disclosure.

In FIG. 4, functions of the color filtering module 301, the filtering module 302 and the binarization module 303 are similar to that described in the foregoing example illustrated with FIG. 3, which are not repeated here.

In the example of the present disclosure, the color filtering module 301 may include an obtaining module 401 and a calculating module 402.

The obtaining module 401 is configured to obtain an original color value of a pixel point in a two-dimension code picture.

The calculating module 402 is configured to perform a color filtering conversion on the original color value of the pixel point in the two-dimension code picture, after the obtaining module 401 obtains the original color value. The calculating module 402 is further configured to obtain a color value of the color-filtered pixel point in the two-dimension code picture. The color value of the color-filtered pixel point in the two-dimension code picture may form the color-filtered two-dimension code picture.

In the example of the present disclosure, the filtering module 302 may include a window obtaining module 404 and a filter processing module 403.

The window obtaining module 404 is configured to obtain a preset window shape and a preset window size about the median filtering.

The filter processing module 403 is configured to perform the median filtering process on the color-filtered two-dimension code picture, based on the preset window shape and window size about the median filtering, and obtain the median-filtered two-dimension code picture, after the window obtaining module 403 obtains the preset window shape and the preset window size about the median filtering.

In the example of the present disclosure, the binarization module 303 may include an information obtaining module 405 and a processing module 406.

The information obtaining module 405 is configured to obtain gray distribution information about the median-filtered two-dimension code picture.

The processing module 406 is configured to perform the binarization process on the median-filtered two-dimension code picture by utilizing the OTSU method, based on the gray distribution information, and obtain the binary image.

In the example of the present disclosure, the mobile terminal may further include an identifying module 407.

The identifying module 407 is configured to perform the two-dimension code identification process on the binary image, and obtain two-dimension code information in the two-dimension code picture, after the binarization module 303 obtains the binary image.

In the example of the present disclosure, the obtaining module 401 in the color filtering module 301 may obtain the original color value of the pixel point in the two-dimension code picture. Subsequently, the calculating module 402 in the color filtering module 301 may perform the color filtering conversion on the original color value of the pixel point in the two-dimension code picture, and obtain a color value of the color-filtered pixel point in the two-dimension code picture. The color value of the color-filtered pixel point in the two-dimension code picture may form the color-filtered two-dimension code picture. Subsequently, the window obtaining module 403 in the filtering module 302 may obtain the preset window shape and the preset window size about the median filtering. The filter processing module 404 in the filtering module 302 may perform the median filtering process on the color-filtered two-dimension code picture, based on the preset window shape and window size about the median filtering, and obtain the median-filtered two-dimension code picture. Subsequently, the information obtaining module 405 in the binarization module 303 may obtain the gray distribution information about the median-filtered two-dimension code picture. The processing module 406 in the binarization module 303 may perform the binarization process on the median-filtered two-dimension code picture by utilizing the OTSU method, based on the gray distribution information, and obtain the binary image. Finally, the identifying module 407 in the mobile terminal may perform the two-dimension code identification process on the binary image, and obtain the two-dimension code information in the two-dimension code picture.

In the example of the present disclosure, the mobile terminal may obtain the original color value of the pixel point in the two-dimension code picture, perform the color filtering conversion on the original color value, obtain the color-filtered two-dimension code picture, perform the median filtering process on the color-filtered two-dimension code picture, based on the preset window shape and window size about the median filtering, obtain the median-filtered two-dimension code picture, perform the binarization process on the median-filtered two-dimension code picture by utilizing the OTSU method, based on the gray distribution information of the median-filtered two-dimension code picture, obtain the binary image, and perform the two-dimension code identification process on the binary image, obtain the two-dimension code information in the two-dimension code picture, such that the two-dimension code may be effectively identified, and the accuracy for identifying the two-dimension code may be improved.

Persons having ordinary skill in the art may understand that all of or part of blocks in the foregoing method examples may be completed by related hardware, which is instructed by a program. The program may be stored in a computer readable storage medium. The foregoing storage medium may be a Read-Only Memory (ROM), disk or Compact Disc (CD), and so on.

Figure 5:
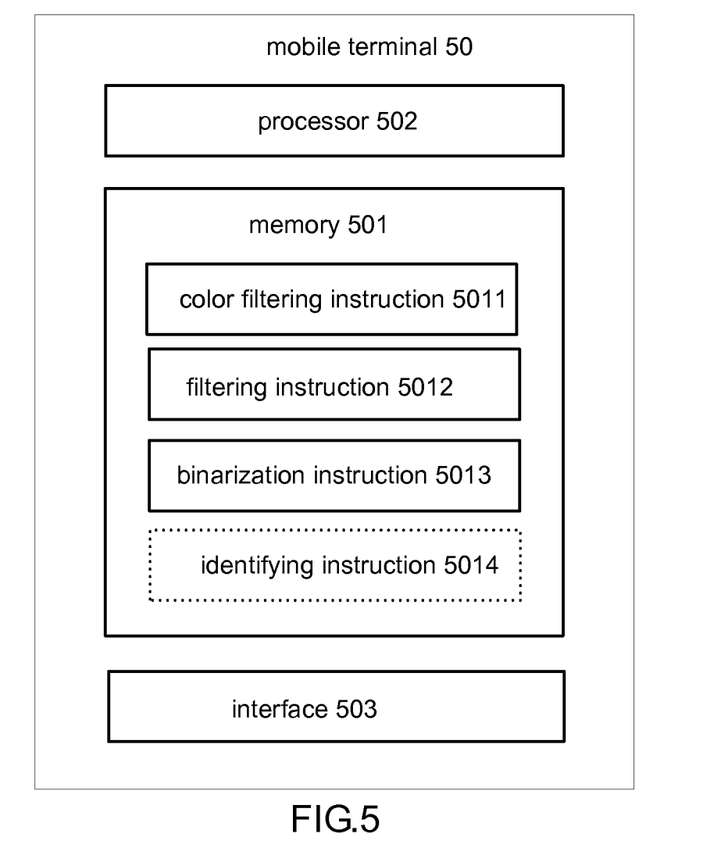
FIG. 5 is a schematic diagram illustrating still another structure of a mobile terminal, in accordance with an example of the present disclosure.

For example, FIG. 5 is a schematic diagram illustrating another structure of a mobile terminal, in accordance with an example of the present disclosure. As shown in FIG. 5, the mobile terminal 50 may include a memory 501, a processor 502 in communication with the memory 501, and an interface 503. The memory 501 may store a color filtering instruction 5011, a filtering instruction 5012 and a binarization instruction 5013, which are executable by the processor 502.

Specifically speaking, the color filtering instruction 5011 may indicate to perform a color filtering process on a two-dimension code picture obtained via the interface 503, and obtain a color-filtered two-dimension code picture.

The filtering instruction 5012 may indicate to perform a median filtering process on the color-filtered two-dimension code picture, and obtain a median-filtered two-dimension code picture, after the color-filtered two-dimension code picture is obtained based on the color filtering instruction 5011.

The binarization instruction 5013 may indicate to perform a binarization process on the median-filtered two-dimension code picture, and obtain a binary image, such that the two-dimension code in the two-dimension code picture may be identified effectively by utilizing the binary image, after the median-filtered two-dimension code picture is obtained based on the filtering instruction 5012.

In the example of the present disclosure, after obtaining the two-dimension code picture by the mobile terminal, the color filtering instruction 5011 may indicate to perform the color filtering process on the obtained two-dimension code picture, and obtain the color-filtered two-dimension code picture. Subsequently, the filtering instruction 5012 may indicate to perform the median filtering process on the color-filtered two-dimension code picture, and obtain the median-filtered two-dimension code picture. Finally, the binarization instruction 5013 may indicate to perform the binarization process on the median-filtered two-dimension code picture, and obtain the binary image, such that the two-dimension code in the two-dimension code picture may be effectively identified by utilizing the binary image.

In the example of the present disclosure, after obtaining the two-dimension code picture, the mobile terminal may perform the color filtering process on the obtained two-dimension code picture, obtain the color-filtered two-dimension code picture, perform the median filtering process on the color-filtered two-dimension code picture, obtain the median-filtered two-dimension code picture, perform the binarization process on the median-filtered two-dimension code picture, obtain the binary image, and utilize the binary image to identify the two-dimension code, such that the accuracy for identifying the two-dimension code may be improved effectively.

Specifically speaking, the color filtering instruction 5011 may include an obtaining instruction and a calculating instruction (not shown in the figure) executable by the processor 502. The filtering instruction 5012 may include a window obtaining instruction and a filter processing instruction (not shown in the figure) executable by the processor 502. The binarization instruction 5013 may include an information obtaining instruction and a processing instruction (not shown in the figure) executable by the processor 502.

In the example of the present disclosure, the memory 501 may further store an identifying instruction 5014 executable by the processor 502.

When being executed by the processor 502, functions of the obtaining instruction, the calculating instruction, the window obtaining instruction, the filter processing instruction, the information obtaining instruction, the processing instruction and the identifying instruction are respectively similar to functions of the obtaining module 401, the calculating module 402, the window obtaining module 404, the filter processing module 403, the information obtaining module 405, the processing module 406 and the identifying module 407 described in the example illustrated with FIG. 4, which are not repeated here.

In the example of the present disclosure, the mobile terminal may obtain the original color value of the pixel point in the two-dimension code picture, perform the color filtering conversion on the original color value, obtain the color-filtered two-dimension code picture, perform the median filtering process on the color-filtered two-dimension code picture, based on the preset window shape and window size about the median filtering, obtain the median-filtered two-dimension code picture, perform the binarization process on the median-filtered two-dimension code picture by utilizing the OTSU method, based on the gray distribution information of the median-filtered two-dimension code picture, obtain the binary image, and perform the two-dimension code identification process on the binary image, obtain the two-dimension code information in the two-dimension code picture, such that the two-dimension code may be effectively identified, and the accuracy for identifying the two-dimension code may be improved.

The invention claimed is:

1. A method for performing an optimization process on a two-dimension code picture, comprising:
    performing a color filtering process on an obtained two-dimension code picture, obtaining a color-filtered two-dimension code picture;
    performing a median filtering process on the color-filtered two-dimension code picture, obtaining a median-filtered two-dimension code picture;
    performing a binarization process on the median-filtered two-dimension code picture, obtaining a binary image, and
    utilizing the binary image to effectively identify a two-dimension code in the two-dimension code picture;
    wherein performing the color filtering process on the obtained two-dimension code picture, and obtaining the color-filtered two-dimension code picture, comprise:
    obtaining an original color value of a pixel point in the two-dimension code picture; and
    performing a color filtering conversion on the original color value of the pixel point in the two-dimension code picture, and obtaining a color value of the color-filtered pixel point in the two-dimension code picture, wherein the color value of the color-filtered pixel point in the two-dimension code picture forms the color-filtered two-dimension code picture.

2. The method according to claim 1, wherein performing the median filtering process on the color-filtered two-dimension code picture, and obtaining the median-filtered two-dimension code picture comprise:

obtaining a preset window shape and a preset window size about the median filtering;

performing the median filtering process on the color-filtered two-dimension code picture, based on the preset window shape and window size about the median filtering, and obtaining the median-filtered two-dimension code picture.

3. The method according to claim 1, wherein performing the binarization process on the median-filtered two-dimension code picture, and obtaining the binary image, comprise:

obtaining gray distribution information about the median-filtered two-dimension code picture;

performing the binarization process on the median-filtered two-dimension code picture by utilizing a maximum between-class variance method, based on the gray distribution information, and obtaining the binary image.

4. The method according to claim 1, further comprising:
performing a two-dimension code identification process on the binary image, and obtaining two-dimension code information in the two-dimension code picture.

5. A mobile terminal, comprising a color filtering module, a filtering module and a binarization module, wherein the color filtering module is configured to perform a color filtering process on an obtained two-dimension code picture, and obtain a color-filtered two-dimension code picture;

the filtering module is configured to perform a median filtering process on the color-filtered two-dimension code picture, and obtain a median-filtered two-dimension code picture, after the color filtering module has obtained the color-filtered two-dimension code picture; and the binarization module is configured to perform a binarization process on the median-filtered two-dimension code picture, obtain a binary image, after the filtering module obtains the median-filtered two-dimension code picture, so as to utilize the binary image to effectively identify a two-dimension code in the two-dimension code picture;

wherein the color filtering module comprises an obtaining module and a calculating module, the obtaining module is configured to obtain an original color value of a pixel point in the two-dimension code picture; and after the obtaining module obtains the original color value, the calculating module is configured to perform a color filtering conversion on the original color value of the pixel point in the two-dimension code picture, obtain a color value of the color-filtered pixel point in the two-dimension code picture, wherein the color value of the color-filtered pixel point in the two-dimension code picture forms the color-filtered two-dimension code picture.

6. The mobile terminal according to claim 5, wherein the filtering module comprises a window obtaining module and a filter processing module, the window obtaining module is configured to obtain a preset window shape and a preset window size, which are about the median filtering; and after the window obtaining module obtains the preset window shape and preset window size about the median filtering, the filter processing module is configured to perform the median filtering process on the color-filtered two-dimension code picture, based on the preset window shape and preset window size about the median filtering, and obtain the median-filtered two-dimension code picture.

7. The mobile terminal according to claim 5, wherein the binarization module comprises an information obtaining module and a processing module, the information obtaining module is configured to obtain gray distribution information about the median-filtered two-dimension code picture; and the processing module is configured to perform the binarization process on the median-filtered two-dimension code picture by utilizing a maximum between-class variance method, based on the gray distribution information, and obtain the binary image.

8. The mobile terminal according to claim 5, wherein the mobile terminal further comprises an identifying module, which is configured to perform a two-dimension code identification process on the binary image, and obtain two-dimension code information in the two-dimension code picture, after the binarization module obtains the binary image.

9. A mobile terminal, comprising a memory, a processor in communication with the memory, and an interface, wherein the memory stores a color filtering instruction, a filtering instruction and a binarization instruction, which are executable by the processor, the color filtering instruction indicates to perform a color filtering process on a two-dimension code picture obtained via the interface, and obtain a color-filtered two-dimension code picture;

the filtering instruction indicates to perform a median filtering process on the color-filtered two-dimension code picture, and obtain a median-filtered two-dimension code picture, after the color-filtered two-dimension code picture has been obtained based on the color filtering instruction; and the binarization instruction indicates to perform a binarization process on the median-filtered two-dimension code picture, obtain a binary image, after the median-filtered two-dimension code picture has been obtained based on the filtering instruction, so as to utilize the binary image to effectively identify a two-dimension code in the two-dimension code picture;

wherein the color filtering instruction comprises an obtaining instruction and a calculating instruction, the obtaining instruction indicates to obtain an original color value of a pixel point in the two-dimension code picture; and after the original color value has been obtained based on the obtaining instruction, the calculating instruction indicates to perform a color filtering conversion on the original color value of the pixel point in the two-dimension code picture, obtain a color value of the color-filtered pixel point in the two-dimension code picture, wherein the color value of the color-filtered pixel point in the two-dimension code picture forms the color-filtered two-dimension code picture.

10. The mobile terminal according to claim 9, wherein the filtering instruction comprises a window obtaining instruction and a filter processing instruction, the window obtaining instruction indicates to obtain a preset window shape and a preset window size, which are about the median filtering; and after the preset window shape and preset window size about the median filtering have been obtained based on the window obtaining instruction, the filter processing instruction indicates to perform the median filtering process on the color-filtered two-dimension code picture, based on the preset window shape and preset window size about the median filtering, and obtain the median-filtered two-dimension code picture.

11. The mobile terminal according to claim 9, wherein the binarization instruction comprises an information obtaining instruction and a processing instruction, the information obtaining instruction indicates to obtain gray distribution information about the median-filtered two-dimension code picture; and the processing instruction indicates to perform the binarization process on the median-filtered two-dimension code picture by utilizing a maximum between-class variance method, based on the gray distribution information, and obtain the binary image.

12. The mobile terminal according to claim 9, wherein the memory further stores an identifying instruction executable by the processor, the identifying instruction indicates to perform a two-dimension code identification process on the binary image, and obtain two-dimension code information in the two-dimension code picture, after the binary image has been obtained based on the binarization instruction.

\* \* \* \* \*